(12) United States Patent
Tibble

(10) Patent No.: US 10,585,975 B2
(45) Date of Patent: Mar. 10, 2020

(54) FINDING DUPLICATE PASSAGES OF TEXT IN A COLLECTION OF TEXT

(75) Inventor: Julian David Tibble, Chipping Norton (GB)

(73) Assignee: GITHUB SOFTWARE UK LTD., Oxford (GB)

( * ) Notice: Subject to any disclaimer, the term of this patent is extended or adjusted under 35 U.S.C. 154(b) by 784 days.

(21) Appl. No.: 13/411,234

(22) Filed: Mar. 2, 2012

(65) Prior Publication Data

US 2013/0232160 A1 Sep. 5, 2013

(51) Int. Cl.
*G06F 17/22* (2006.01)

(52) U.S. Cl.
CPC ................ *G06F 17/2211* (2013.01)

(58) Field of Classification Search
None
See application file for complete search history.

(56) References Cited

U.S. PATENT DOCUMENTS

| | | | | |
|---|---|---|---|---|
| 5,051,745 | A * | 9/1991 | Katz | 341/51 |
| 9,342,621 | B1 * | 5/2016 | Raphel | G06F 17/30949 |
| 2001/0043616 | A1 * | 11/2001 | Hild et al. | 370/477 |

OTHER PUBLICATIONS

Schleimer et al., "Winnowing: Local Algorithms for Document Fingerprinting", SIGMOD '03 Proceedings of the 2003 ACM SIGMOD international conference on Management of data pp. 76-85, ACM New York, NY, USA © 2003.*
Crochemore, et al., "Pattern Matching in Strings", Algorithms and theory of computation handbook, Chapman & Hall/CRC © 2010.*
Subroto et al., "Plagiarism Detection on the Student Assignment from Internet using Words n-grams Fingerprints", PARS 2008, Jun. 30-Jul. 3, 2008, Johor, Malaysia. UTM.*
Purwitasari et al., "The Use of Hartigan Index for Initializing K-Means++ in Detecting Similar Texts of Clustered Documents as a Plagiarism Indicator", Asian Journal of Information Technology, vol. 10, No. 8, 2011.*
Brin et al., "Copy Detection Mechanisms for Digital Documents", SIGMOD' 95,San Jose , CA USA, 1995.*
Broder et al., "Syntactic clustering of the Web", Published by Elsevier Science B.V., 1997.*

* cited by examiner

*Primary Examiner* — Mohsen Almani
(74) *Attorney, Agent, or Firm* — Workman Nydegger

(57) ABSTRACT

A novel system and computer-implemented method for quickly and efficiently finding and reporting all clones with a large corpus of text. This is achieved by tokenizing the corpus, computing a rolling hash, filtering for hashes that occur more than once, and constructing an equivalence relation over these hashes in which hashes are equated if they are part of the same instance of duplication. The equivalence relation is then used to report all detected clones.

19 Claims, 7 Drawing Sheets

Hashes for file 0401

| Segment | Hash |
|---|---|
| 0411 | 6 |
| 0412 | 27 |
| 0413 | 10 |
| 0414 | 71 |

Hashes for file 0402

| Segment | Hash |
|---|---|
| 0415 | 27 |
| 0416 | 10 |
| 0417 | 53 |
| 0418 | 1 |

Hashes for file 0403

| Segment | Hash |
|---|---|
| 0419 | 88 |
| 0420 | 27 |
| 0421 | 10 |
| 0422 | 71 |

Filtered hashes 0405

| Hash |
|---|
| 10 |
| 27 |
| 71 |

Table 0406

| | Successor hashes |
|---|---|
| 10 | 53,71 |
| 27 | 10 |
| 71 | ⊥ |

Table 0407

| | Predecessor hashes |
|---|---|
| 10 | 27 |
| 27 | 6,88,⊥ |
| 71 | 10 |

Condition 0408

$$successors(h_1) = \{h_2\}$$
$$\wedge$$
$$predecessors(h_2) = \{h_1\}$$

Equivalence Relation 0409

FINDING DUPLICATE PASSAGES OF TEXT IN A COLLECTION OF TEXT

CROSS-REFERENCE TO RELATED APPLICATIONS

Not applicable.

FIELD OF THE INVENTION

The present invention generally relates to pattern matching of text and more specifically to identifying duplicate passages of text in a large collection of text.

BACKGROUND OF THE INVENTION

Clone detection is the process of finding passages of text that are identical, or very similar, to other text in a collection or a corpus of text. Such passages may be undesirable for several reasons: they may cause redundant work, they may be inconsistent, and they may be a result of unethical behavior, such as unauthorized copying. For example, clone detection in academia is used to detect plagiarism and is therefore also known as plagiarism detection.

In software development, clone detection is used to find instructions to the computer that have been copied from one part of the software to another. Such copying makes the software unnecessarily larger, and therefore more expensive to maintain, and increases the cost of fixing defects because defective instructions must be fixed in every copy. In this context, clone detection is also known as copy-paste detection.

SUMMARY OF THE INVENTION

The clone detection process usually begins by computing what is known as a rolling hash. Similar to a rolling average, a rolling hash is calculated by choosing some chunk-size N, and taking the hash (or "fingerprint") of every sequence of N contiguous words in the corpus. Hashing is precisely defined below; what is important is that two identical sequences always have the same hash, but non-identical sequences are very unlikely to do so. Furthermore, hashes are numeric values that are more easily processed by machines than sequences of words. Hashes that occur more than once in the corpus identify cloned passages of text.

After the rolling hashes are computed, they require post-processing before cloned passages are reported. Evidently, they must be processed to find those hashes that occur more than once but, even after this step, further processing is necessary. FIG. 1 illustrates the result of computing a 5-word rolling hash on two identical documents of 100 words each. In this example there are 96 matching hashes. If these matches were reported individually then the results would be misleading and difficult interpret. More specifically, the magnitude of 96 reports for a single instance of duplication is not intuitive. Instead, it would be better if these 96 reports were collapsed into 1.

The present invention provides a process and system for collapsing many matching hashes into a smaller number of easy to interpret reports. The collapsing method is more efficient than any known method.

More generally, the present invention determines whether a single document contains identical or cloned portions from a reference corpus. The corpus of text is tokenized and then a rolling hash is computed. The hash is filtered for hashes that occur more than once. An equivalence relation is constructed over these hashes in which hashes are equated if they are part of the same instance of duplication. The equivalence relation is then used to report all detected clones.

In one example, the corpus is a collection of files from one or more software products, the files containing instructions in one or more programming languages.

The corpus of another example consists of all the essays written by a cohort of students for an academic examination.

The constructed equivalence relation of another example consists of a union-find data-structure.

Another example only reads the corpus during the initial tokenization phase and the final reporting phase. Intermediate phases that maintain all their data in the fast random-access memory of a single computer may be used. Moreover, the first and the last phases may be partitioned by the natural division of the corpus into sub-parts, and the intermediate stages may be initially partitioned by hash and then merged.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Definitions

Equivalence Relation—an equivalence relation over a set S is a division of the members of S into non-overlapping partitions. The usual interpretation is that members in the same partition are equivalent in some sense, whereas members in different partitions are not.

Hash—a function from some (usually unbounded) input domain, to a fixed sized output domain (usually a subset of the integers). A good hash function distributes values from its input domain uniformly and apparently randomly across its output domain.

Rolling Hash—computing a rolling hash means computing the hash of every sequence of N consecutive tokens in a list of tokens. Some hash functions are especially suited to this because it is possible to compute the hash of one sequence in constant time given the value of the hash of the immediately preceding sequence.

Segment—a continuous sequence of tokens as used to compute a rolling hash.

Segment size—number of tokens in a continuous sequence as used to compute a rolling hash.

Text—is a symbolic representation of any multimedia content including computer programs, written description, audio content, and video content.

Token—a single unit of text in a corpus. For plagiarism detection this may be a word. For copy-paste detection, the tokens of a programming language are defined by the language's specification; they typically consist of sequences of letters and digits, numbers, and punctuation symbols.

Tokenization—the process by which a passage of text is broken up into its constituent tokens.

Union-Find Structure—an abstract data type (data structure+algorithms for manipulating it) for representing and manipulating equivalence relations efficiently; it has two operations—union and find—for joining two equivalence classes, and finding the representative member for an equivalence class, respectively. In one example an equivalence relation is produced using a union-find abstract data type.

Embodiments

Figure 2:
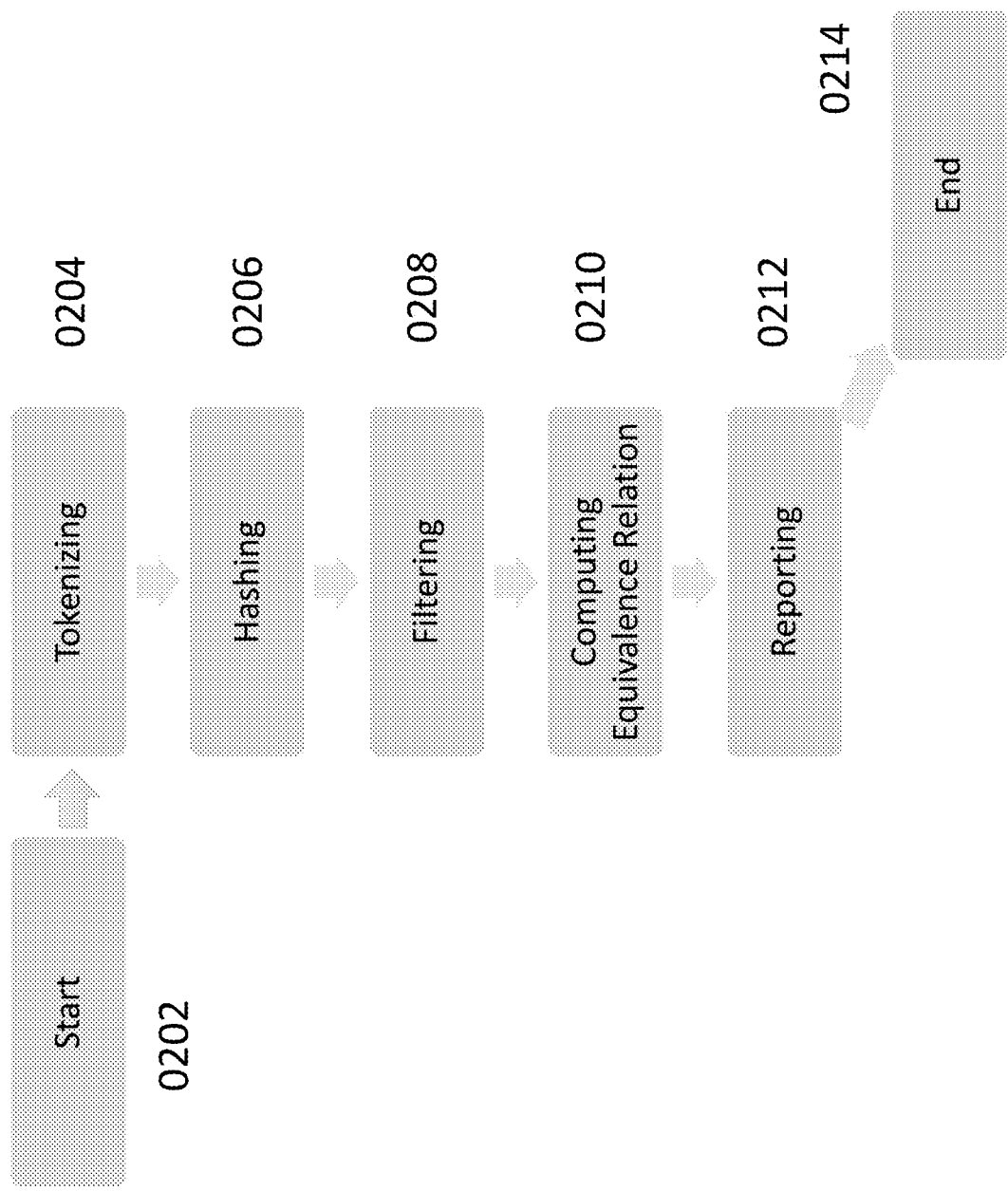
FIG. 2 illustrates a high-level flow of the clone-detection process.

A high level flow diagram of the duplicative text detection or clone-detection process is shown in FIG. 2. Duplicative text detection begins in step 202 and immediately proceeds to step 204 in which a corpus of text is accessed and is tokenized. The tokenization is performed according to an algorithm. One tokenization algorithm is described in FIG. 3. For example, the algorithm in one example, breaks up the corpus of text into a set of one or more overlapping segments, where each segment is a specified number of adjacent tokens. The number of adjacent tokens can be changed by a user.

Next, in step 206 a rolling hash is computed over the tokenized version of the corpus of text or "tokens" for short to produce a collection of hash values. The algorithm in this example may produce one hash value per segment. In step 208, the tokens after the rolling hash are filtered to create a collection of those hashes that occur more than once in the corpus. Stated differently, hash values that two or more segments have in common are identified from the collection of hash values.

An equivalence relation is computed over the hash values, such that hashes in a same piece of duplicative text are equivalent These hashes then form the domain of an equivalence relation, in which the equivalence classes are single instances of cloning in step 210.

Based on the equivalence relation, a report of pieces of duplicate text, or detected clones, found in the corpus of text is produced in step 214. The report in one example, uses the collection of hash values to map the pieces of duplicate text back to their respective locations in the corpus of text. The process ends in step 214. Each of these high level steps shown in FIG. 2 will now be described in further detail.

Every corpus may be naturally divided up into parts. For example, the natural division of a corpus of essays is into single essays. In contrast, the natural unit of a software system is a single file of instructions. For brevity, we will refer to the parts of a corpus as files below.

Figure 3:
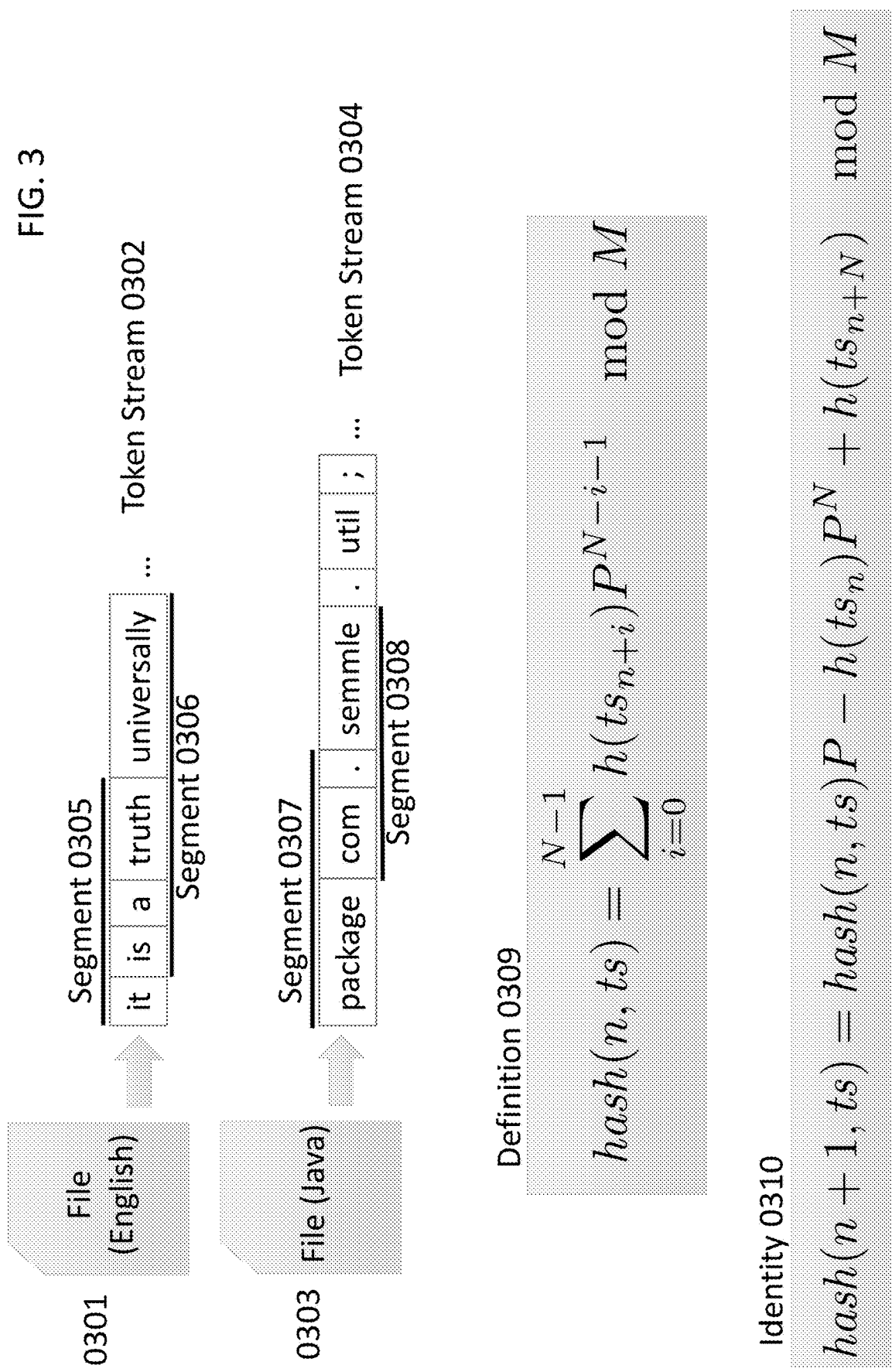
FIG. 3 depicts tokenization and computing rolling hashes.

FIG. 3 demonstrates the tokenizing process on file 0301, such as a chapter of a book, and source code file 0303, such as program written in the Java programming language. A token is an individual unit such as a word or punctuation mark, and tokenizing is splitting up a file into a list of tokens. The first five tokens of file 0301 are "it", "is", "a", "truth", and "universally".

Tokenizing is more than simply chopping up a file. For example, the tokenizing process illustrated in FIG. 3 on file 0301 discards all punctuation and converts all words to lower-case. As the current invention detects clones by finding identical sequences of tokens in the corpus, this tokenizing process would detect plagiarism even if the punctuation had been changed in the clone.

After a file is tokenized, a rolling hash is computed over the token stream. A rolling hash is a hash or "fingerprint" of every sequence of N consecutive tokens for some positive integer N. Such a sequence is called a segment. For example, Segment 0305 in FIG. 3 is a segment of length 4 and Segment 0306 follows it. Note that adjacent segments overlap by all but one token. Also, Segment 0307 is of length 3 and Segment 0308 follows it.

Definition 0309 is a definition of a suitable rolling-hash function, where P is a prime number, M is a large integer such as $2^{64}$, N is the length of segments to use, n is the number of the segment within a file to compute the hash of, and ts is the list of tokens within that file. It is a suitable hash-function because it is efficient to "roll"—that is, hash (n+1,ts) may be computed from hash(n,ts) in constant time, as equation 0310 demonstrates.

Figure 4:
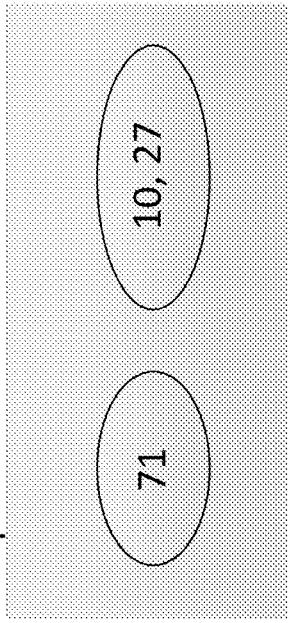
FIG. 4 depicts the post-processing of the rolling hashes.

FIG. 4 shows the results of computing a rolling hash on files 0401, 0402, and 0403. There is a passage of text cloned in all three files—identifiable by the repeated sequence of hashes [27,10]. Having computed the hashes, those that occur more than once are collected, as shown in table 0405.

Tables 0406 and 0407 show the successors and predecessors, respectively, for each hash in table 0405. For any two hashes $h_1$ and $h_2$, $h_1$ is a successor of $h_2$ if there is a segment with hash $h_1$ in any file followed by a segment with hash $h_2$. Similarly, $h_1$ is a predecessor of $h_2$ if $h_2$ is a successor of $h_1$. Not all segments have a successor and a predecessor: the first segment in a file has no predecessor, and the last segment has no successor. In these cases the special symbol ⊥ is used instead of a hash as shown in tables 0406 and 0407.

Figure 1:
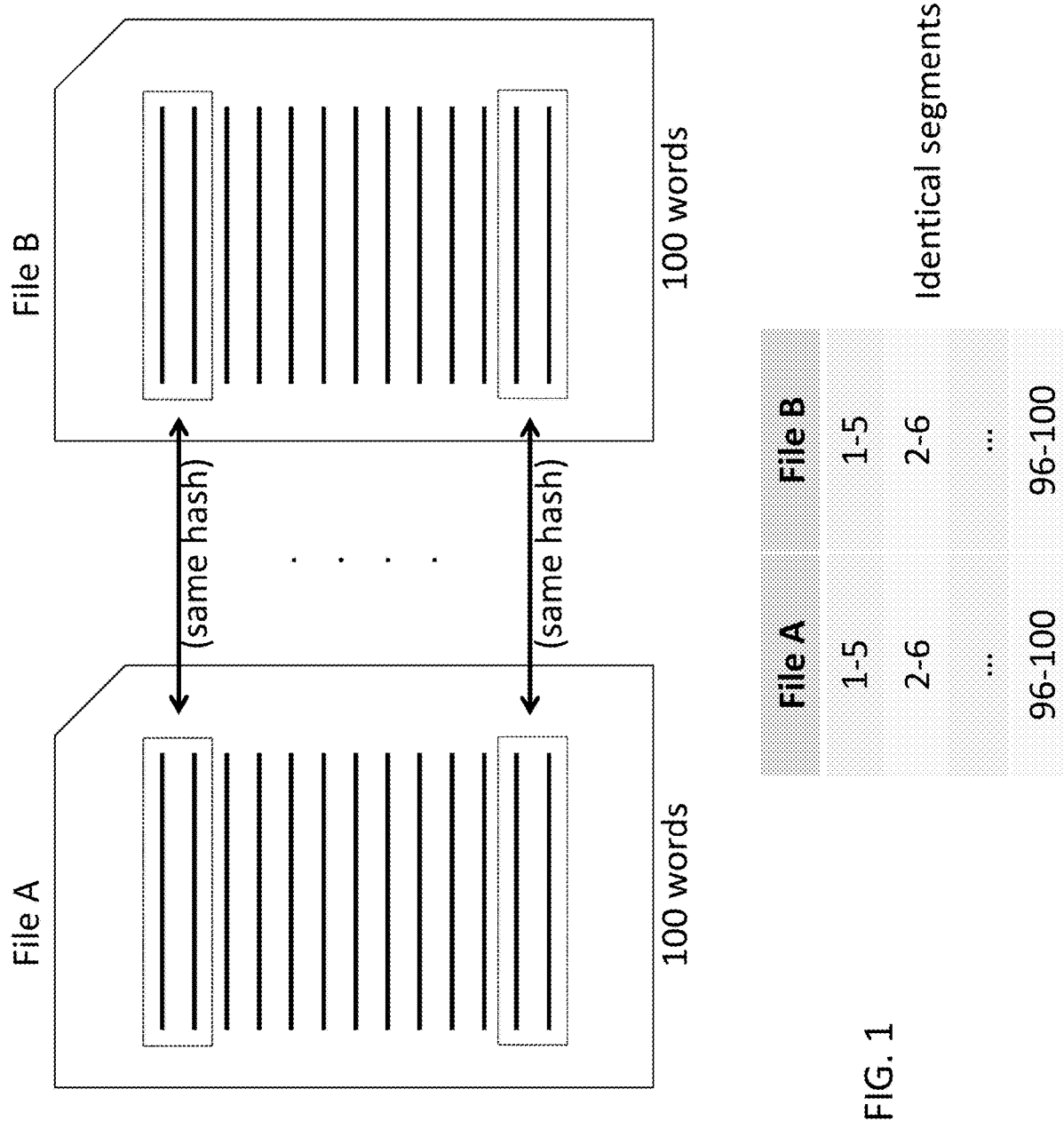
FIG. 1 illustrates a multitude of matching hashes yielded by a single clone.

Recall from the discussion of FIG. 1 that one instance of duplication may involve many segments. Indeed, the clone shown in files 0401, 0402 and 0403 consists of a pair of segments the first with hash 27 and the second with hash 10. Instances of duplication are constructed from individual hashes using an equivalence relation, for example 0409. Hashes in the equivalence relation are considered equivalent if they are adjacent, which is determined using condition 0408. For any two hashes $h_1$ and $h_2$, $h_1$ is adjacent to $h_2$ if $h_2$ is the sole successor of $h_1$ and $h_1$ is the sole predecessor of $h_2$.

Equivalence relation 0409 is efficiently constructed using a union-find abstract data type (ADT). The structure is initialized with as many partitions as there are hashes in table 0405, and initially each hash is in a separate partition. Next, pairs of corresponding entries are found in tables 0406 and 0407 that satisfy the adjacency condition (in this case there is one pair: <27,10> and <10,27>). Each time a pair of adjacent hashes is found, they are merged using the union operation of the union-find ADT. The result is equivalence relation 0409.

Figure 5:
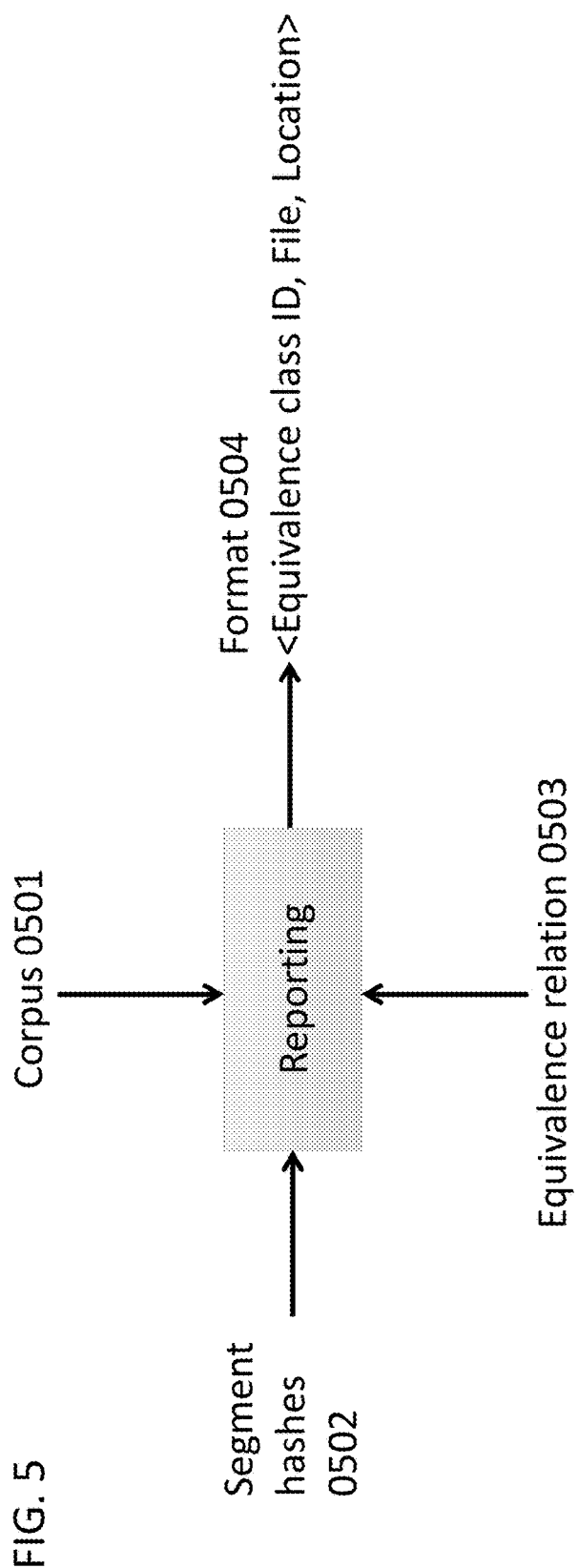
FIG. 5 depicts one possible report from the clone-detection process.

Finally, as shown in FIG. 5, the clones found are reported by combining data from the corpus (0501), the table of segment-hash pairs for each file in the corpus (0502), and the equivalence relation from the previous step (0503). The data from 0502 is necessary to map the clones found back to their originating segments in the corpus, and the corpus (0501) is needed to map segment IDs to more useful location information. Exactly what constitutes more useful location information is application-specific. For example, when detecting clones in software systems, it is usual to report the file name, start line, start column, end line, and end column so that the cloned portion may be highlighted on the screen. For plagiarism detection over essays, a combination of file name, paragraph number, and start/end word number may be more appropriate. The clones are reported in format 0504: for each equivalence class in relation 0503, the file and location of each clone is output, as shown in example 0505.

In one example of implementation on a single computer system, the corpus is stored as files in a directory structure on a hard disk. In this example, the directory structure is traversed and, for each file, the file is tokenized and a rolling hash is computed; the hashes for each file are retained in random-access memory (RAM), but the file contents (and tokens) are discarded. At the reporting stage, the directory structure is again traversed and, for each file in turn, the necessary data for reporting clones is read from the file before discarding the contents again. Those skilled in the art will appreciate that, although this solution reads each file twice, it scales to extremely large corpora, even on a commodity computer, by keeping the minimum necessary data in RAM.

Figure 6:
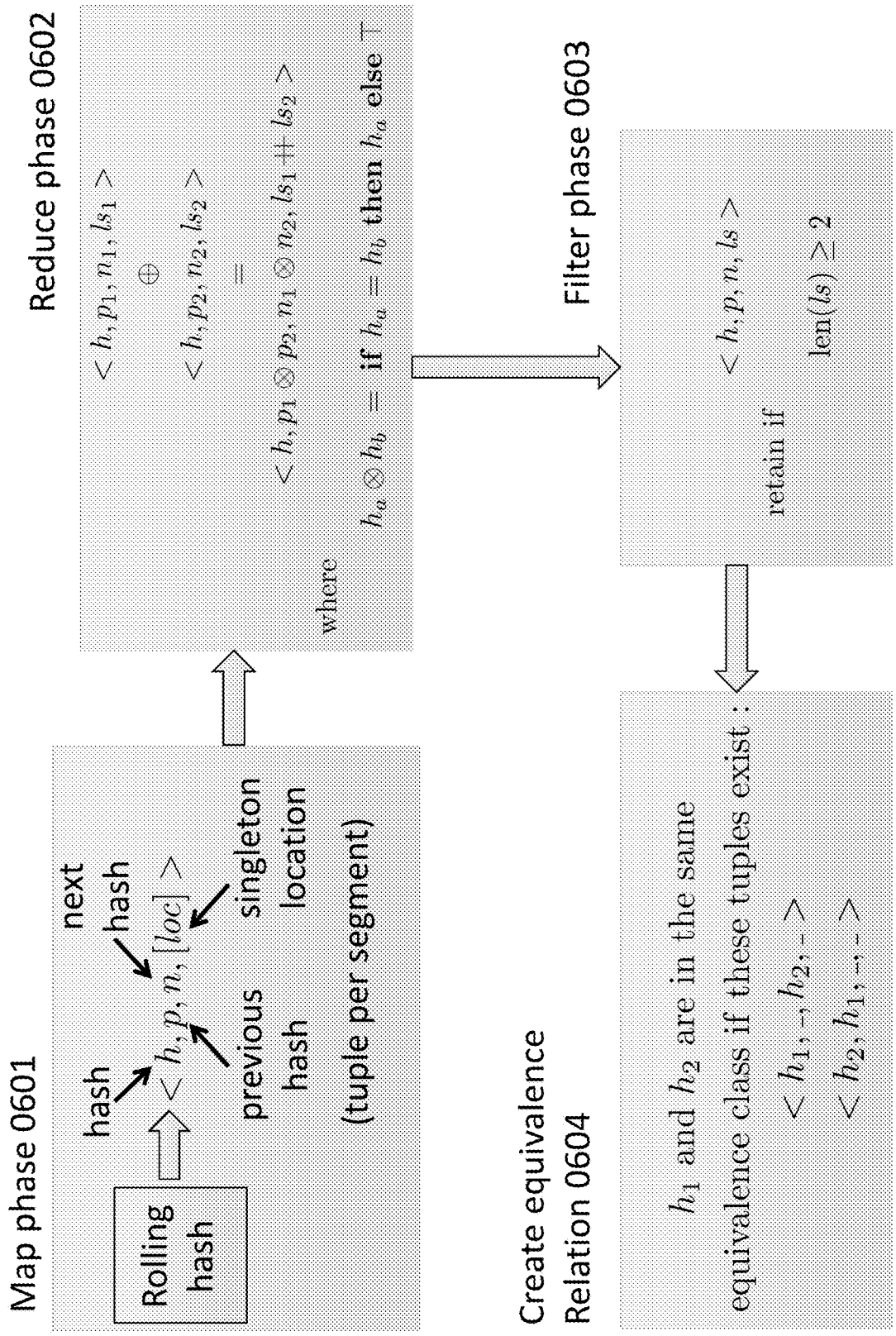
FIG. 6 depicts an example of the invention that uses a cluster of interconnected computers.

The present invention may also be implemented as a MapReduce-style computation using a networked cluster of computers, as shown in FIG. 6. This implementation has four phases: map phase 0601, reduce phase 0602, filtering phase 0603, and equivalence relation construction phase 0604. Map phase 0601 is implemented by one or more mappers. Each of these mappers reads in one or more files and computes a rolling hash over each one. For each segment in a file, the mapper outputs a four-tuple consisting of the segment's hash, the hash of the previous segment, the hash of the following segment, and the location of the segment. The reduce phase 0602 is implemented by one or more reducers, which combine the output of the mappers according to the formulae given in 0602. Next, a parallel filtering phase (0603), filters the results of 0602 to only retain entries for hashes that occur more than once. The results of stage 0603 are small enough to be processed on a single machine in stage 0604, which constructs equivalence relation (0604) according to the rules shown in FIG. 6.

Non-Limiting Hardware Examples

Overall, the present invention can be realized in hardware or a combination of hardware and software. The processing system according to one example can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

Figure 7:
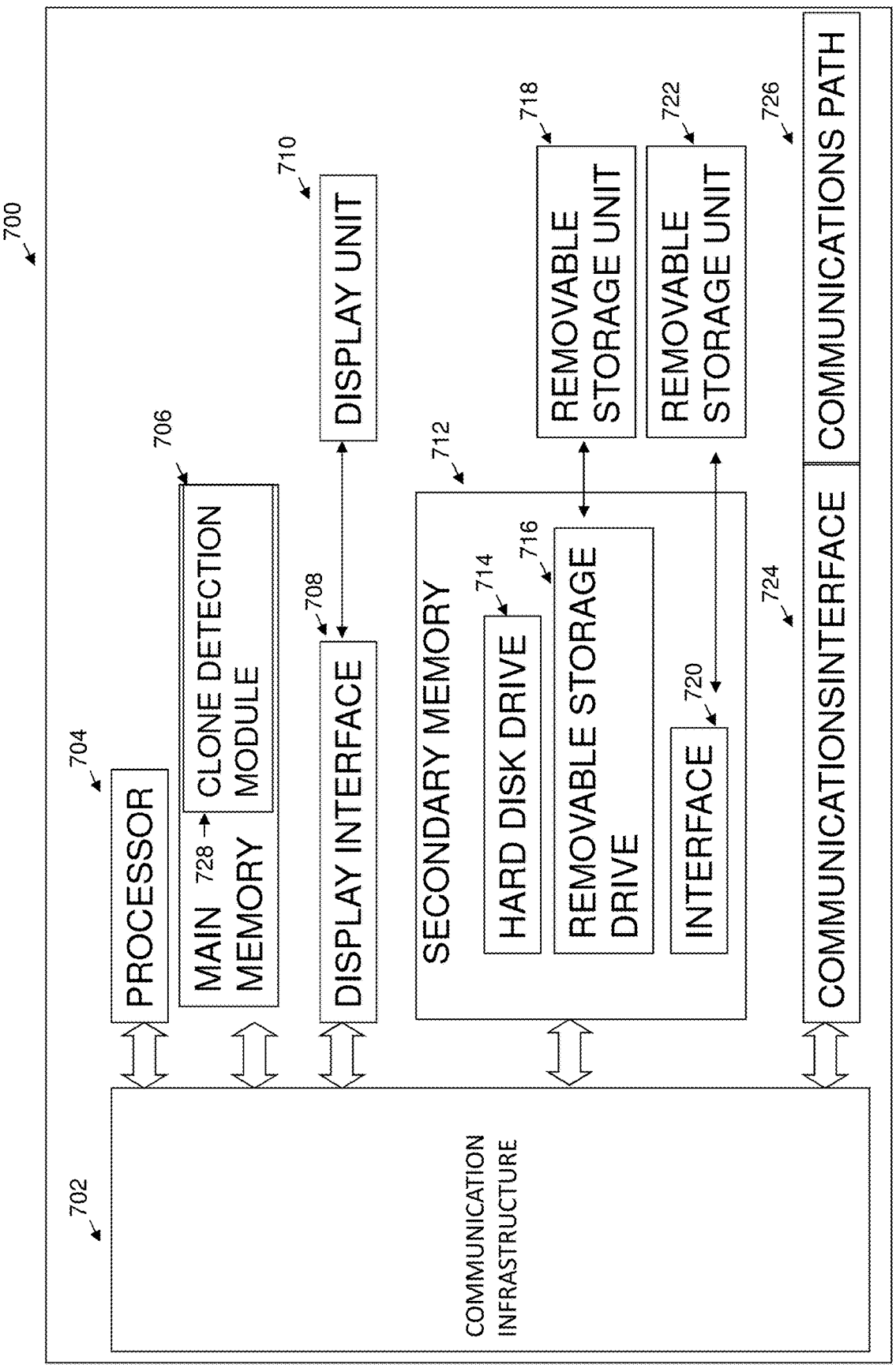
FIG. 7 is a block diagram of a computer system useful for implementing the filtering module.

In one example, the present invention can also be embedded in a computer program product, which comprises all the features enabling the implementation of the methods described herein, and which—when loaded in a computer system—is able to carry out these methods. Computer program or computer readable program code means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form. FIG. 7 is a block diagram of a computer system useful for implementing the filtering module. Computer system (0700) includes a display interface (0708) that forwards graphics, text, and other data from the communication infrastructure (0702) (or from a frame buffer not shown) for display on the display unit (0710). Computer system (0700) also includes a processor (0702) communicatively coupled to main memory (0706), preferably random access memory (RAM), and optionally includes a secondary memory (0712). The secondary memory (0712) includes, for example, a hard disk drive (0714) and/or a removable storage drive (0716), representing a floppy disk drive, a magnetic tape drive, an optical disk drive, etc. A clone detection algorithm 728, such as that shown in of FIG. 2, is implanted in Main Memory (0706). The removable computer readable storage drive (0716) reads from and/or writes to a removable storage unit 718 in a manner well known to those having ordinary skill in the art. Removable storage unit (0718), represents a CD, DVD, magnetic tape, optical disk, etc. which is read by and written to by removable storage drive (0716). As will be appreciated, the removable storage unit (0718) includes a computer usable storage medium having stored therein computer software and/or data. The terms "computer program medium," "computer usable medium," and "computer readable medium" are used to generally refer to media such as main memory (0706) and secondary memory (0712), removable storage drive (0716), a hard disk installed in hard disk drive (0714), and signals.

Computer system (0700) also optionally includes a communications interface 724. Communications interface (0724) allows software and data to be transferred between computer system (0700) and external devices. Examples of communications interface (0724) include a modem, a network interface (such as an Ethernet card), a communications port, a PCMCIA slot and card, etc. Software and data transferred via communications interface (0724) are in the form of signals which may be, for example, electronic, electromagnetic, optical, or other signals capable of being received by communications interface (0724). These signals are provided to communications interface (0724) via a communications path (i.e., channel) (0726). This channel (0726) carries signals and is implemented using wire or cable, fiber optics, a phone line, a cellular phone link, an RF link, and/or other communications channels.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A computer-implemented method for duplicate text detection, the method comprising:

producing a respective tokenized version of at least a portion of each file in a plurality of files of a corpus of text, and generating from each tokenized version of each file a respective sequence of overlapping segments for the file, wherein each segment for each file is a specified number of adjacent tokens in the file, and wherein the order of the segments in the sequence of overlapping segments matches the order in the file of the tokens that make up the segments;

calculating one hash value for each overlapping segment of each file of the plurality of files of the corpus of text to produce respective sequences of hash values, wherein each sequence of hash values corresponds to a file of the plurality of files of the corpus of text, and wherein each sequence of hash values for a file corresponds in order to the segments in the sequence of overlapping segments for the file;

determining duplicate hash values that each occur in more than one of the sequences of hash values for the plurality of files in the corpus of text;

creating partitions that each include one of the duplicate hash values, wherein each duplicate hash value is in exactly one of the partitions;

determining duplicate hash values in the partitions that are adjacent hash values, wherein any two hash values H1 and H2 are adjacent hash values if and only if every occurrence of H1 in the sequences of hash values for the plurality of files in the corpus of text is followed by H2, and every occurrence of H2 in the sequences of hash values for the plurality of files in the corpus of text is preceded by H1;

until all pairs of adjacent hash values in the partitions have been found:
  finding pairs of adjacent hash values that were determined as adjacent in the determining duplicate hash values step and that are each in different respective partitions, and
  for each such pair of adjacent hash values, merging respective partitions having the adjacent hash values to form a respective merged partition; and after the merging of partitions having adjacent hash values is completed and using the partitions that remain after the merging, producing a report of pieces of duplicate text found in the corpus of text based on each remaining partition representing a single instance of text duplication.

2. The method of claim 1, where producing the report of pieces of duplicate text found in the corpus of text includes using the hash values in the remaining partitions to map the pieces of duplicate text back to their respective locations in the corpus of text.

3. The method of claim 1, where merging respective partitions having the adjacent hash values to form a respective merged partition comprises merging respective partitions using a union-find abstract data type.

4. The method of claim 1, wherein calculating one hash value for each overlapping segment of each file of the plurality of files of the corpus of text comprises calculating a rolling hash over each of the overlapping segments of each file of the plurality of files of the corpus of text.

5. The method of claim 4, wherein calculating a rolling hash over each of the overlapping segments is done according to:

$$\text{hash}(n, ts) = \sum_{i=0}^{N-1} h(ts_{n+i}) P^{N-i-1} \bmod M$$

where n is a number of the segment in the corpus of text, ts is a list of constitute tokens, N is a segment size to use, P is a prime number, M is an integer greater than 1000.

6. The method of claim 1, wherein producing a respective tokenized version of at least the portion of each file in the plurality of files of the corpus of text comprises preliminarily converting words to a lower case form and discarding punctuation in at least the portion of each file in the plurality of files of the corpus of text.

7. The method of claim 1, wherein merging respective partitions having the adjacent hash values to form the respective merged partition comprises merging respective partitions having the adjacent hash values to form the respective merged partition that includes only hash values that represent different portions of a contiguous passage of duplicate text.

8. A system comprising:
memory;
at least one processor communicatively coupled to the memory, and together configured for:
  producing a respective tokenized version of at least a portion of each file in a plurality of files of a corpus of text, and generating from each tokenized version of each file a respective sequence of overlapping segments for the file, wherein each segment for each file is a specified number of adjacent tokens in the file, and wherein the order of the segments in the sequence of overlapping segments matches the order in the file of the tokens that make up the segments;
  calculating one hash value for each overlapping segment of each file of the plurality of files of the corpus of text to produce respective sequences of hash values, wherein each sequence of hash values corresponds to a file of the plurality of files of the corpus of text, and wherein each sequence of hash values for a file corresponds in order to the segments in the sequence of overlapping segments for the file;
  determining duplicate hash values that each occur in more than one of the sequences of hash values for the plurality of files in the corpus of text;
  creating partitions that each include one of the duplicate hash values, wherein each duplicate hash value is in exactly one of the partitions;
  determining duplicate hash values in the partitions that are adjacent hash values, wherein any two hash values H1 and H2 are adjacent hash values if and only if every occurrence of H1 in the sequences of hash values for the plurality of files in the corpus of text is followed by H2, and every occurrence of H2 in the sequences of hash values for the plurality of files in the corpus of text is preceded by H1, in the sequence of hash values;
  until all pairs of adjacent hash values in the partitions have been found:
    finding pairs of adjacent hash values that were determined as adjacent in the determining duplicate hash values step and that are each in different respective partitions, and
    for each such pair of adjacent hash values, merging respective partitions having the adjacent hash values to form a respective merged partition; and
  after the merging of partitions having adjacent hash values is completed and using the partitions that remain after the merging, producing a report of pieces of duplicate text found in the corpus of text based on each remaining partition representing a single instance of text duplication.

9. The system of claim 8, where producing the report of pieces of duplicate text found in the corpus of text includes using the hash values in the remaining partitions to map the pieces of duplicate text back to their respective locations in the corpus of text.

10. The system of claim 8, where merging respective partitions having the adjacent hash values to form a respective merged partition comprises merging respective partitions using a union-find abstract data type.

11. The system of claim 8, wherein calculating one hash value for each overlapping segment of each file of the plurality of files of the corpus of text comprises calculating a rolling hash over each of the overlapping segments of each file of the plurality of files of the corpus of text.

12. The system of claim 11, wherein calculating a rolling hash over each of the overlapping segments is done according to:

$$\text{hash}(n, ts) = \sum_{i=0}^{N-1} h(ts_{n+i}) P^{N-i-1} \bmod M$$

where n is a number of the segment in the corpus of text, ts is a list of constitute tokens, N is a segment size to use, P is a prime number, M is an integer greater than 1000.

13. The system of claim 8, wherein producing a tokenized version of at least the portion of each file in the plurality of files of the corpus of text comprises preliminarily converting words to a lower case form and discarding punctuation in at least the portion of each file in the plurality of files of the corpus of text.

14. A computer program product comprising a hardware storage unit having computer readable program code embodied therewith, the computer readable program code configured for:

producing a respective tokenized version of at least a portion of each file in a plurality of files of a corpus of text, and generating from each tokenized version of each file a respective sequence of overlapping segments for the file, wherein each segment for each file is a specified number of adjacent tokens in the file, and wherein the order of the segments in the sequence of overlapping segments matches the order in the file of the tokens that make up the segments;

calculating one hash value for each overlapping segment of each file of the plurality of files of the corpus of text to produce respective sequences of hash values, wherein each sequence of hash values corresponds to a file of the plurality of files of the corpus of text, and wherein each sequence of hash values for a file corresponds in order to the segments in the sequence of overlapping segments for the file;

determining duplicate hash values that each occur more than once in the sequence of hash values, wherein each duplicate hash value is different than each of the other duplicate hash values;

creating partitions that each include one of the duplicate hash values, wherein each duplicate hash value is in exactly one of the partitions;

determining duplicate hash values in the partitions that are adjacent hash values, wherein any two hash values H1 and H2 are adjacent hash values if and only if every occurrence of H1 in the sequences of hash values for the plurality of files in the corpus of text is followed by H2, and every occurrence of H2 in the sequences of hash values for the plurality of files in the corpus of text is preceded by H1, in the sequence of hash values;

until all pairs of adjacent hash values in the partitions have been found:
  finding pairs of adjacent hash values that were determined as adjacent in the determining duplicate hash values step and that are each in different respective partitions, and
  for each such pair of adjacent hash values, merging respective partitions having the adjacent hash values to form a respective merged partition; and after the merging of partitions having adjacent hash values is completed and using the partitions that remain after the merging, producing a report of pieces of duplicate text found in the corpus of text based on each remaining partition representing a single instance of text duplication.

15. The computer program product of claim 14, where producing the report of pieces of duplicate text found in the corpus of text includes using the hash values in the remaining partitions to map the pieces of duplicate text back to their respective locations in the corpus of text.

16. The computer program product of claim 14, where merging respective partitions having the adjacent hash values to form a respective merged partition comprises merging respective partitions using a union-find abstract data type.

17. The computer program product of claim 14, wherein calculating one hash value for each overlapping segment of each file of the plurality of files of the corpus of text comprises calculating a rolling hash over each of the overlapping segments of each file of the plurality of files of the corpus of text.

18. The computer program product of claim 17, wherein calculating a rolling hash over each of the overlapping segments is done according to:

$$\text{hash}(n, ts) = \sum_{i=0}^{N-1} h(ts_{n+i}) P^{N-i-1} \bmod M$$

where n is a number of the segment in the corpus of text, ts is a list of constitute tokens, N is a segment size to use, P is a prime number, M is an integer greater than 1000.

19. The computer program product of claim 14, wherein producing a tokenized version of at least the portion of each file in the plurality of files of the corpus of text comprises preliminarily converting words to a lower case form and discarding punctuation in at least the portion of each file in the plurality of files of the corpus of text.

* * * * *